United States Patent Office 3,330,413
Patented July 11, 1967

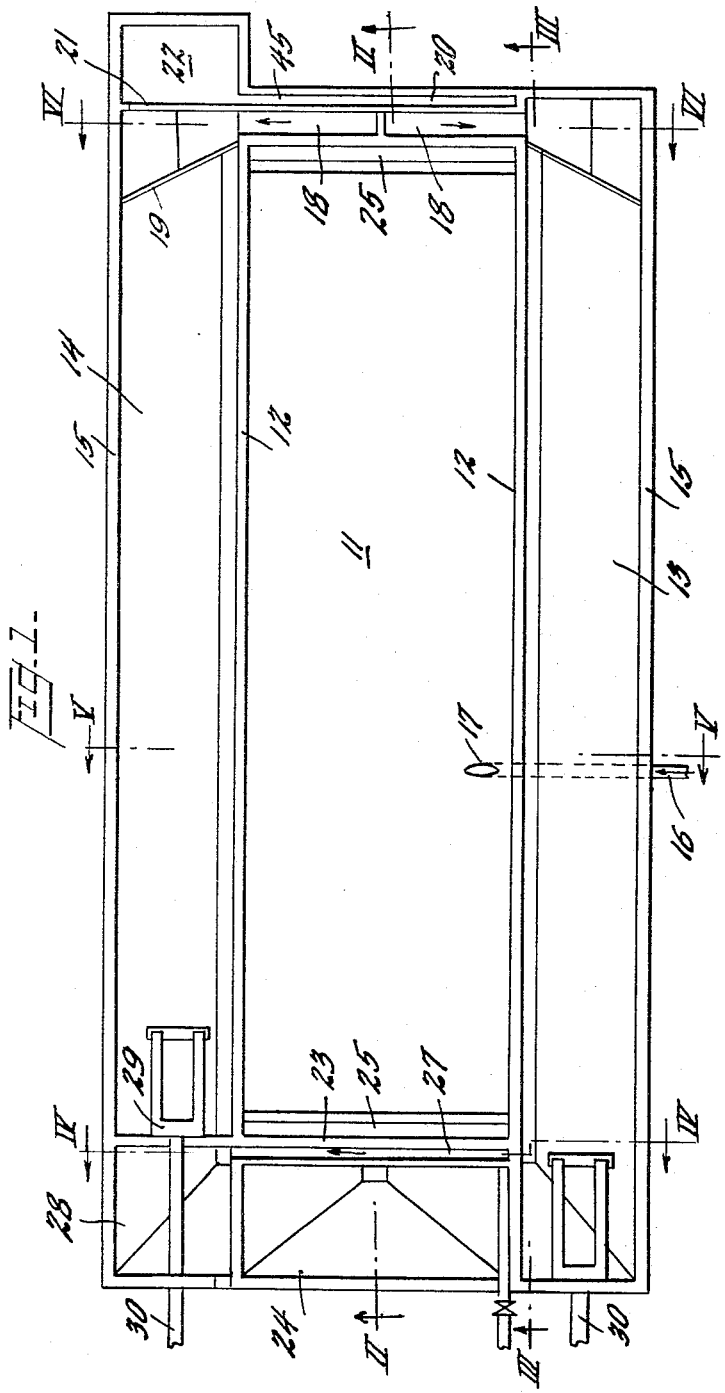

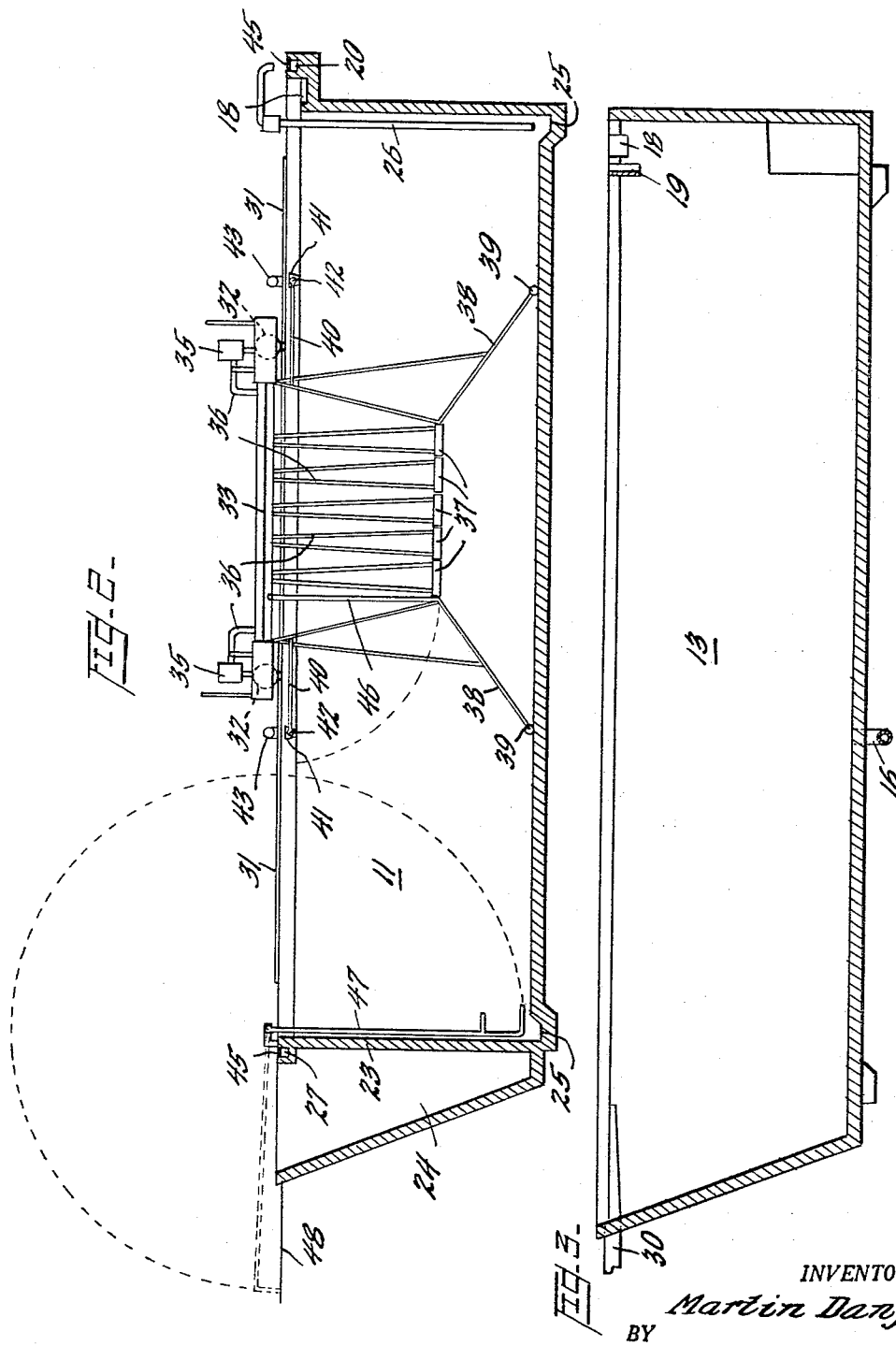

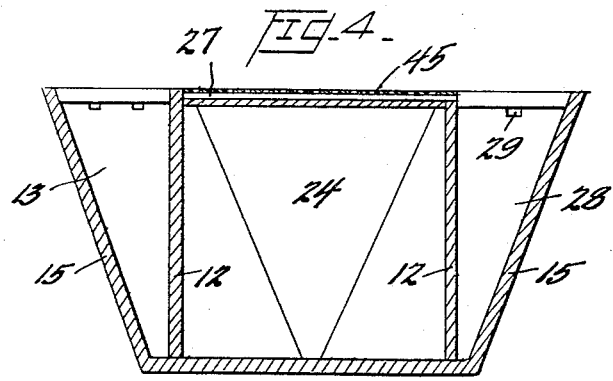
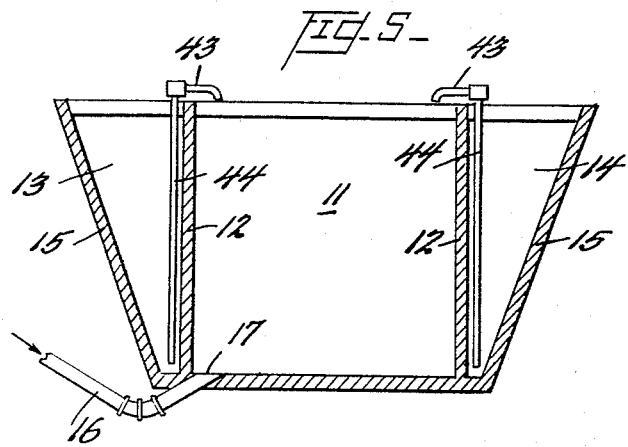
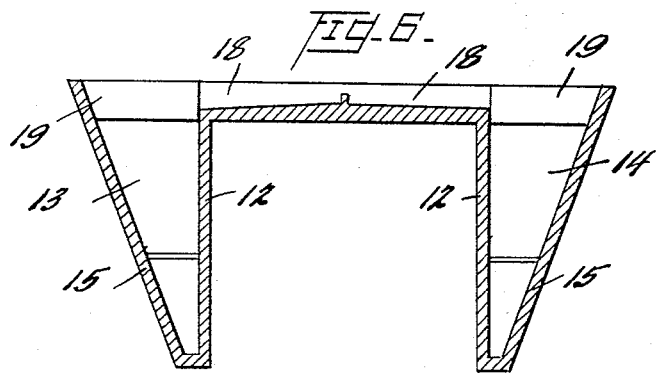

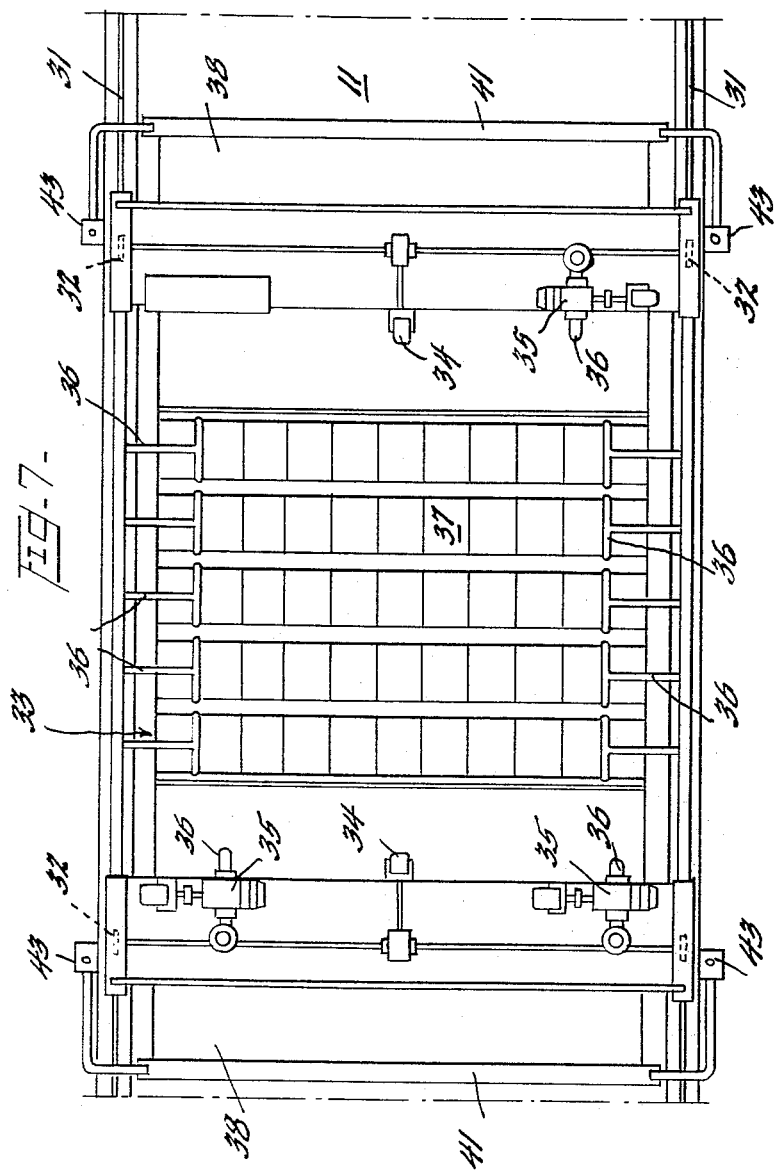

3,330,413
APPARATUS FOR BIOLOGICAL PURIFICATION
OF SEWAGE WATER
Martin Danjes, 493 Detmold, Hermannstrafe 3,
Detmold, Germany
Filed Sept. 30, 1964, Ser. No. 400,414
11 Claims. (Cl. 210—195)

This invention relates to a method of biological purification of sewage water, which includes the employment of an aerated basin for mechanically operated circulation and separate aeration of the sewage water, and to a plant in which this method is carried out.

In one of the purifying procedures currently in use, the sewage water is mechanically circulated by rotating wings which are fastened to a rotating shaft extending in longitudinal direction in the basin, and it is aerated in that a fine dispersion of compressed air is introduced into the water where the lift of the air bubbles is opposed to the flow direction of the circulating water. It has also been suggested to apply a coarser type of aeration to the water circulation, while in order to enrich the water with oxygen, air of finer dispersion is introduced independently of the water circulation, and to arrange the points of air introduction into the basin of both aeration systems over the whole length of the basin alternately one behind the other. It is a common feature of the methods known hitherto that the entire sewage water contained in the basin is circulated at the same time, which causes large outlay in energy and reduces the efficiency of the sewerage plant.

Accordingly, one object of the present invention is to render the biological purification of sewage water more economical.

Another object of the invention is to render the biological purification of sewage water more economical so that less energy is required for the operation of the plant.

A further object is to render the biological purification of sewage water more economical by separating the mechanical water circulation and its aeration from each other.

A still further object is to lift only a certain amount of sewage water from the sphere of the bottom of the basin at a time and to force this partial water quantity into a horizontal current near the water surface and to aerate said horizontal flow.

While so far it has been necessary to avoid mud deposits in the basin to keep all the sewage water in the basin circulating at a certain speed, which causes considerable expense in moving energy, the gradual raising of the water in partial quantities at a time as provided for by the invention largely reduces the energy demand. Also, the aeration of the sewage water is particularly efficient in view of the fact that the lift of the air bubbles is vertical with respect to the horizontal water current, thus providing an optimum relation between the aeration depth and formation of new boundaries between the rising air bubbles and the sewage water. The size of the horizontal water current near the water surface is such that the oxygen demand of the microorganisms can be economically covered by the aeration.

The suggested method may be carried out irrespective of the shape of the basin. Therefore, the employment of the method according to the invention does not only result in savings in actual operating expense but also helps reducing building expenses for the aeration basin to be used, thus making it even more economical to run the plant.

The circulation and aeration may be discontinued for some time so that in the stationary part of the basin, as the mud particles sink to the bottom a layer of clear water can be formed which later on is drawn off. Together with the first partial raising of the sewage water following the interruption of the process, the mud deposits on the bottom of the basin are whirled up again in suspension. This enables an intermittent operation of the plant without it being necessary to provide a secondary waste water settling basin.

By reciprocating motion of the circulation and aeration device over the whole extension of the aeration basin the entire water quantity in the basin is successively aerated and the oxygen consumed by the biological absorption process, is continually replaced. The speed of the reciprocating motion of the circulation and aeration device in the basin depends on prevailing operational conditions and may be varied within a wide scope. This makes it possible to adjust the efficiency of the aeration basin to the sewage charge without making any changes in the construction of the basin. The energy consumption of the plant is thus limited proportionately to the amount of sewage contained in the water.

As another feature of the invention, there is provided an apparatus for carrying out the aforementioned method, comprising an aeration basin with sewage water, an aeration device and a circulation device which are united into a joint assembly and means for moving said assembly in reciprocating motion over the length of said aeration basin.

As a further feature, the circulation device consists of an inclined water damming surface corresponding to the cross section of the aeration basin and extending with its lower edge slightly above the bottom of the basin.

By the reciprocating motion of the damming surface the sewage water is raised and transformed into a horizontal current near the water level. The aeration device, which is connected to a compressor, is preferably arranged at the damming surface and is developed for coarse, medium or fine air dispersion according to existing conditions.

Preferably, two inclined damming surfaces are attached to a travelling mechanism in a position in which one is the reflection of the other. The travelling mechanism is guided on rails at both sides of the basin and driven by an electric motor, by cable pull or a similar method, and, apart from the damming surfaces, also carries the aeration device supplying air to the horizontal sewage water current.

To ensure aeration of the water with fine air bubbles, the air may be distributed by filter plates, for which purpose porous materials based on plastic substances are recommendable. For aeration with medium, fine or coarse air bubbles it is advantageous to provide punched sheet metal plates or sieves of a plastic material or metal in combination with jets screwed into the plates.

The aeration basin with its travelling circulation and aeration assembly may be combined with secondary sewage water settling basins, to be arranged at both sides of the aeration basin, which construction forms a particularly advantageous feature of the invention. The two secondary basins are fed by conveying pumps mounted in the corners of the travelling mechanism of the aeration basin and conveying the mud from the secondary basins into the aeration basin. It is advantageous to use compressed air lift pumps as they can be supplied with compressed air by the compressor of the aeration assembly. The pumps preferably convey the mud and water mixture into a gutter which extends transversely across the basin above the water level and it attached to the travelling mechanism. The mud and water mixture flowing from the gutter destroys any foam which may have formed on the water surface of the aeration basin. The gutter may be mounted in such a manner that it can be tipped downwards from time to time for removal of the mud which has deposited therein.

Any sewage components which cannot be decomposed, such as fibrines etc., are collected in gutters sunk into the bottom of the basin and its end portions, and are from time to time removed, as for instance by compressed air lift pumps.

The aeration basin may be of rectangular as well as of circular shape, and it may be used for the complete cleaning process or secondary to a preliminary cleaning basin of the conventional type.

Further advantages and details of the invention will become apparent from the following detailed description when considered with reference to the accompanying drawings in which an example of a plant for carrying out the method according to the invention, as illustrated.

In the drawings:

FIG. 1 is a top plan view of an aeration basin with two secondary waste water settling basins lateral thereof;

FIG. 2 is a vertical section taken on line II—II of FIG. 1;

FIG. 3 is a vertical section taken on line III—III of FIG. 1;

FIG. 4 is a vertical cross section taken on line IV—IV of FIG. 1;

FIG. 5 is a vertical cross section taken on line V—V of FIG. 1;

FIG. 6 is a vertical cross section taken on line VI—VI of FIG. 1; and

FIG. 7 is a top plan view of the aeration assembly.

A rectangular aeration basin 11 is provided with two side walls 12, at the external sides of which secondary waste water settling basins 13 and 14 respectively are arranged. The secondary waste water settling basins 13 and 14 each having an inclined bottom wall 15. A feed pipe 16 extends below the inclined bottom wall 15 and terminates with its orifice 17 at the bottom of the aeration basin 11. Secondary basins 14 and 13 are connected with each other by a discharge channel 18 provided at the end of the aeration basin 11 and extending level to the normal height of water within the aeration basin 11. At the junctions of channel 18 and secondary basins 13 and 14 respectively, a vertical wall 19 is provided built therein which extends in oblique direction of the longitudinal axis of the basins 13 and 14 respectively and is immersed into the water so that any substances floating in the water which are carried along in channel 18 from the aeration basin 11 can be separated before reaching the settling basins 13 and 14 respectively. A sand gutter 20 is provided parallel to the discharge channel 18 remote from the aeration basin 11 and is in communication with a sand gathering basin 22, which is separated by a wall 21 from the secondary waste water settling basin 14.

By means of a vertical wall 23, which is arranged in the aeration basin 11 at its end opposite to discharge channel 18, a mud concentrating basin 24 having an inclined bottom is separated from the aeration basin 11. Provided in the bottom of aeration basin 11 near each of its two ends in a trough 25, above which a suction opening of a compressed air lift pump 26 is provided. Of these two pumps, FIG. 2 only illustrates pump 26 at the front end of the basin near the sand gutter 20. By pumps 26 the sand etc. deposited in channels 25, is conveyed into sand gutter 20 and into a gutter 27 at the upper end of wall 23. Gutter 27 leads to a sand basin 28 located in the longitudinal axis of the secondary waste water settling basin 14 and being connected with the latter by an overflow 29. The side of the mud concentrating basin 24 at the far end of sand basin 28, is bordered by the end portion of the secondary waste water settling basin 13 from which the discharge pipe 30 for clean water emanates.

As shown in FIG. 2 and 7, a rail 31 is arranged at the top on each lateral wall 12 of the aeration basin 11 and there is provided an electric motor 34 at one end for forward motion and a second electric motor 34 at the other end for backward motion. Instead of the electric motors 34 one may employ a cable pull, which is not shown in the drawings. A travelling carriage 33 furthermore has a plurality of compressors 35 mounted thereon, which are each connected with an electric motor. The compressors 35 are provided with horizontal and vertical air distributor pipes 36 leading to aeration devices 37, which extend below the water level horizontally over the whole width of the aeration basin 11 and at their upper sides are provided with air outlets for aeration of coarse, medium or fine dispersion. The aeration devices 37 may be in the shape of boxes, or they may be formed by punched pipes. An inclined damming surface 38 is attached to the front side and the rear side of the aeration devices 37 and is shaped according to the cross section of the aeration basin 11, and in the example shown in the drawings it is a rectangular plate. The two damming surfaces are symmetrical as to one another, and they are held by supporting elements attached to the travelling mechanism. At their lower edges the damming surfaces 38 are only slightly elevated above the bottom of the basin. If necessary, their guidance is improved by additional guiding rollers 39.

Above each damming surface 38, there is provided an arm 40 slightly raised above the water level and extending in longitudinal direction of the basin, and carrying a transverse gutter 41, each of which swings around a horizontal axis 42. The transverse gutters 41 extend across the whole width of the aeration basin 11 below the discharge openings of compressed air lift pumps 43 which are arranged in all the corners of the travelling mechanism 33 and are linked with the oulet side of the pertinent compressor 35. As shown in FIG. 5, the suction pipe of each of the four lift pumps 43 projects over the lateral wall 12 into the secondary basins 13 and 14 respectively, where it ends just above the bottom of the basin.

It is recommended to provide grills 45 above the two gutters 27 and 20 so that fibrines or any other substances which do not decompose and which have gathered within the troughs 25 are segregated. Instead, these substances may be removed by hand from time to time, for instance by means of a rake or a similar appliance.

When the plant is operated the travelling mechanism 33 is reciprocated over the whole length of the aeration basin 11, which causes the sewage water to be raised by the respective front damming surface 38 from the sphere of the bottom of the basin to the sphere of the water level and to be forced into a horizontal current above the aeration devices 37. The compressed air, emerging from the aeration devices 37 rises in transverse direction of the sewage water current and conveys into it, the oxygen necessary for the biological purification of the sewage water. As the same time, the mud which has deposited at the bottom of the basin is whirled up to be in suspension, and the mud containing water in its horizontal flow near the water level is subjected to the impact of the comparatively long upward travel of the air bubbles. The sewage water in aeration basin 11 which is behind the travelling mechanism 33, is stationary and consumes the oxygen introduced into it by the aeration devices 37 so that the biological purification process takes place.

The heavier sand which has not been whirled up will deposit in the troughs 25 at the ends of the bottom of the basin. From time to time the compressed air lift pump 26, which is stationed here, is connected to the air outlet of one of the compressors 35 of the travelling mechanism 33 which will then stand still in its inoperative position. Thereupon the sand, deposited in the respective trough 25 is pumped into the upper gutter 27 or the sand gutter 20, from where it moves into the sand basin 28.

During the front and back motion of the travelling mechanism 33, the suction pipes 44 of the four compressed air lift pumps 43 will serve the two secondary waste water settling basins 13 and 14. The mud in the water from basins 13 and 14 taken in by suction pipes 44 is conveyed into the two transverse gutters 41, from where it flows into the aeration basin 11, spreading over the whole width of the basin 11 and at the same time destroying any foam swimming on the water surface of the basin 11. The mud conveyed by the compressed air lift pumps 43 gathers within the transverse gutters 41, which are from time to time turned around their horizontal axis to drop the mud into the aeration basin 11.

A rake 46 may be provided on the travelling mechanism 33 to take up fibrines and similar matter. Rake 46 is cleaned when, according to necessity, the travelling mechanism 33 is in inoperative position near the wall of the basin 11. As indicated in FIG. 2 by the circular arc drawn in a broken line, the rake 46 can be swung 90° to be placed into a horizontal position. A stripper 47, which swings around a horizontal axis, is provided at the wall 23 to face the rake 46 and is given a supporting surface 48 outside the aeration basin 11.

When the rake 46 is clogged by fibrines etc, the travelling mechanism 33 is stopped in the vicinity of the wall 23 of the aeration basin 11 and the rake 46 is swung 90° to assume a horizontal position. Thereafter, stripper 47 is turned from its vertical inoperative position in a circular direction, as shown by the broken line of FIG. 2, and engages the bars of the rake 46, which causes the fibrines etc. to be removed from the rake 46 and to be conveyed to the supporting surface 48 as the stripper 47 is further turned around its axis. Supporting surface 48 may be cleaned from time to time as is necessary under the circumstances.

Although the present invention has been described with reference to a particular embodiment thereof, it should be understood that those skilled in the art may make other modifications and embodiments which will fall within the spirit and scope of the principles of this invention.

What is claimed and desired to be secured by Letters Patent of the United States is:

1. A device for the biological purification of sewage water comprising an aeration basin, an inclined damming surface in the basin, extending over the whole width of the aeration basin, and an aeration device, connected to a compressor, said damming surface, aeration device and compressor being mounted on a travelling mechanism movable over the whole length of said aeration basin.

2. A device for the biological purification of sewage water comprising an aeration basin, an inclined damming surface in the basin extending over the whole width of the aeration basin and an aeration device, approximately at the level of the upper edge of said damming surface, said damming surface, aeration device and compressor being mounted on a travellling mechanism movable over the whole length of said aeration basin.

3. A device for the biological purification of sewage water comprising an aeration basin, an inclined damming surface in the basin having a lower edge so arranged that the surface is guided by the lower edge at least near the bottom of said aeration basin, an aeration device provided on the upper edge of said damming surface, and means to place said damming surface in reciprocating motion over the whole length of said aeration basin.

4. A device for the biological purification of sewage water comprising an aeration basin, an inclined damming surface in the basin arranged at either end of a travelling mechanism and the pair of damming surfaces being in symmetrical position of each other and extending over the whole width of the aeration basin, and an aeration device connected to a compressor, said damming surface, aeration device and compressor being mounted on a travelling mechanism movable over the whole length of said aeration basin.

5. A device for the biological purification of sewage water comprising an aeration basin, an inclined damming surface in the basin having a lower edge so arranged that the surface is guided by the lower edge at least near the bottom of said aeration basin, an aeration device provided on the upper edge of said damming surface, means to place said damming surface in reciprocating motion over the whole length of said aeration basin, and a secondary waste water settling basin provided at each side of the aeration basin, said secondary waste water settling basins being connected by a channel provided at each end of the aeration basin near the water surface.

6. A device for the biological purification of sewage water comprising an aeration basin, an inclined damming surface in the basin having a lower edge so arranged that the surface is guided by the lower edge at least near the bottom of said aeration basin, an aeration device provided on the upper edge of said damming surface, means to place said damming surface in reciprocating motion over the whole length of said aeration basin, a secondary waste water settling basin provided at each side of the aeration basin, and said secondary waste water settling basins being connected by a channel provided at each end of the aeration basin near the water surface, and pumps arranged as travelling mechanism, said pumps having suction pipes terminating slightly above the bottom of said secondary waste water settling basins.

7. A device for the biological purification of sewage water comprising an aeration basin, an inclined damming surface in the basin having a lower edge so arranged that the surface is guided by the lower edge at least near the bottom of said aeration basin, an aeration device provided on the upper edge of said damming surface, a travelling mechanism to place said damming surface in reciprocating motion over the whole length of said aeration basin, and secondary waste water settling basins on each side of the aeration basin, said travelling mechanism having means thereon and on the aeration basin to permit the reciprocating motion of the mechanism.

8. A device for the biological purification of sewage water comprising an aeration basin, an inclined damming surface in the basin having a lower edge so arranged that the surface is guided by the lower edge at least near the bottom of said aeration basin, an aeration device provided on the upper edge of said damming surface, a travelling mechanism to place said damming surface in reciprocating motion over the whole length of said aeration basin, and secondary waste water settling basins on each side of the aeration basin.

9. A device for the biological purification of sewage water comprising an aeration basin, an inclined damming surface guided above the bottom of said aeration basin, an aeration device on the upper edge of said damming surface, means to place said damming surface in reciprocating motion over the whole length of said aeration basin, a secondary waste water settling basin provided at each side of the aeration basin with said secondary waste water settling basins connected by a channel provided at each end of the aeration basin near the water surface and having a wall, said wall being arranged at the junctions of said secondary waste water settling basins with their connecting channel, said wall being adapted to segregate any substances floating on the waste water.

10. A device for the biological purification of sewage water comprising an aeration basin, an inclined damming surface guided on and above the bottom of said aeration basin, an aeration device mounted on the damming surface, means to place said damming surface in reciprocating motion over the whole length of said aeration basin, and a secondary waste water settling basin provided on each side of the aeration basin, said secondary waste water settling basins being connected by a channel provided at each end of the aeration basin near the water surface and having a sand basin arranged at the end of one of said secondary waste water settling basins, said sand basin having admission gutters extending over the the width of the aeration basin and being provided with means segregating fibrines and similar substances.

11. A device for the biological purification of sewage water comprising an aeration basin, an inclined damming surface in the basin and guided above a bottom of said aeration basin, an aeration device on the said damming surface, means to place said damming surface in reciprocating motion over the whole length of said aeration basin, a secondary waste water settling basin provided at each side of the aeration basin, said secondary waste water settling basins being connected by a channel provided at each end of the aeration basin near the water surface and having a trough to take up deposits of the water provided at the bottom of the aeration basin near its two ends, a travelling mechanism and a suction pipe with a pump connected to a compressor of said travelling mechanism.

References Cited

UNITED STATES PATENTS

| 1,536,961 | 5/1925 | McMillan | 210—413 X |
| 2,271,446 | 1/1942 | Unger | 210—63 |
| 2,825,541 | 3/1958 | Moll et al. | 210—221 IX |
| 3,133,017 | 5/1964 | Lambeth | 210—14 XR |

FOREIGN PATENTS 1,278,964  1/1961  France.

MORRIS O. WOLK, *Primary Examiner.*

MICHAEL E. ROGERS, *Examiner.*